United States Patent

Holmes et al.

[11] Patent Number: 5,899,436
[45] Date of Patent: May 4, 1999

[54] DUAL GAIN PRESSURE CONTROL SOLENOID HAVING ONE BOBBIN WITH TWO INDIVIDUALLY WOUND COILS, A HIGH FORCE COIL AND A LOW FORCE COIL FOR IMPROVING TRANSFER FUNCTION

[75] Inventors: Garrett R. Holmes, Ortonville; Bradley C. Erickson, Clarkston, both of Mich.

[73] Assignee: Borg-Warner Auomotive, Inc., Sterling Heights, Mich.

[21] Appl. No.: 08/911,692

[22] Filed: Aug. 15, 1997

[51] Int. Cl.⁶ .................................................. F16K 31/02
[52] U.S. Cl. .................................... 251/129.15; 251/129.1
[58] Field of Search ........................... 251/129.1, 129.08, 251/129.15, 129.17

[56] References Cited

U.S. PATENT DOCUMENTS

| | | |
|---|---|---|
| 1,090,902 | 3/1914 | Beckwith . |
| 1,177,761 | 4/1916 | Clemmer . |
| 1,216,658 | 2/1917 | Cinq-Mars . |
| 1,243,219 | 10/1917 | Ralphs . |
| 1,457,599 | 6/1923 | Pace . |
| 1,624,132 | 4/1927 | Brown . |
| 1,700,029 | 1/1929 | Dady et al. . |
| 1,978,737 | 10/1934 | Bower et al. . |
| 2,268,960 | 1/1942 | Ray . |
| 2,769,943 | 11/1956 | Matthews . |
| 4,065,096 | 12/1977 | Frantz et al. . |
| 4,361,309 | 11/1982 | Sogabe . |
| 4,546,955 | 10/1985 | Beyer et al. . |
| 4,624,282 | 11/1986 | Fargo . |
| 4,649,803 | 3/1987 | Abel ..................................... 251/129.1 |
| 4,760,491 | 7/1988 | Hurley . |
| 4,948,093 | 8/1990 | Sugawara et al. . |
| 5,108,070 | 4/1992 | Tominaga . |
| 5,178,359 | 1/1993 | Stobbs et al. . |
| 5,189,991 | 3/1993 | Humburg . |
| 5,218,996 | 6/1993 | Schmitt-Matzon .................... 251/129.1 |
| 5,328,150 | 7/1994 | Guativa ................................ 251/129.1 |
| 5,441,232 | 8/1995 | Tanaka . |
| 5,460,329 | 10/1995 | Sturman . |
| 5,490,534 | 2/1996 | Van Rens . |

*Primary Examiner*—Denise L. Ferensic
*Assistant Examiner*—Meredith Schoenfeld
*Attorney, Agent, or Firm*—Harness, Dickey & Pierce; Greg Dziegielewsli

[57] ABSTRACT

A dual gain pressure control solenoid having two individually wound coils. One coil has a greater number of turns than the other coil and operates as a high force coil. The coil with a lesser number of turns operates as a low force coil. The low force coil provides improved resolution over a predetermine range of input current, while the high force coil provides less resolution but greater force. The coils may be used in various operational modes in order to achieve improved resolution over a predetermined current range.

16 Claims, 4 Drawing Sheets

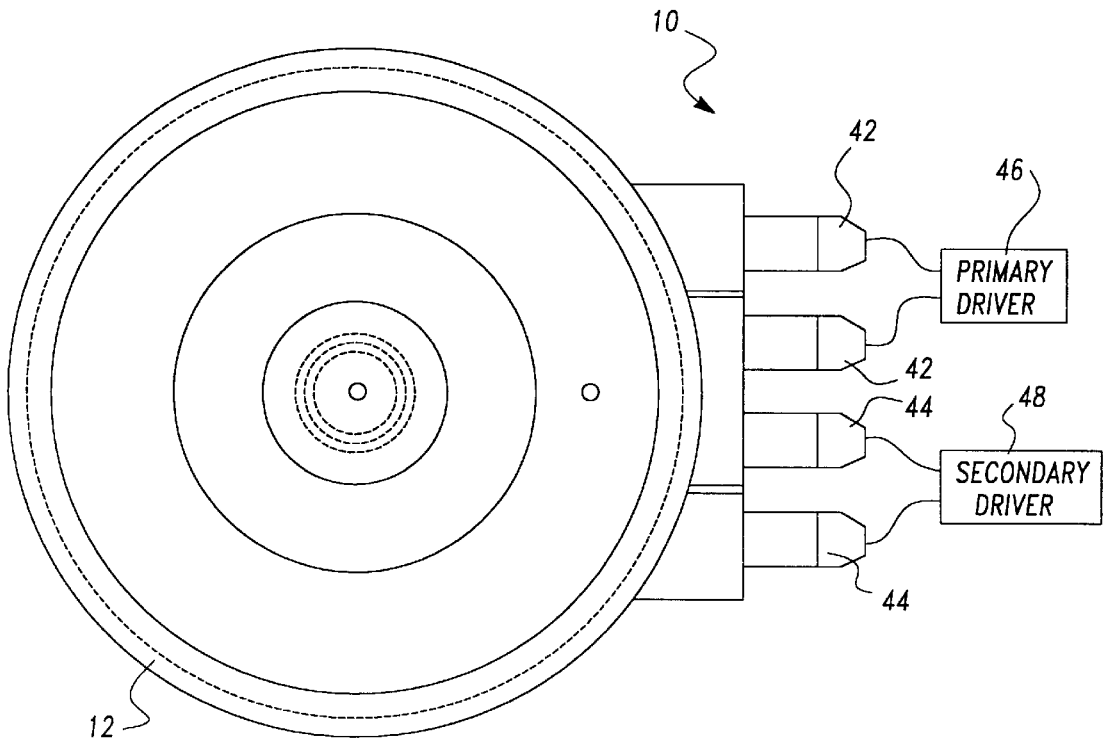
*Fig-2*
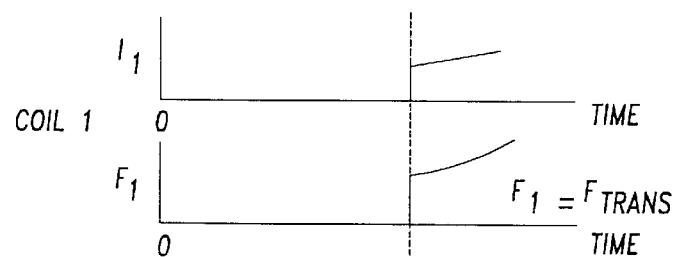
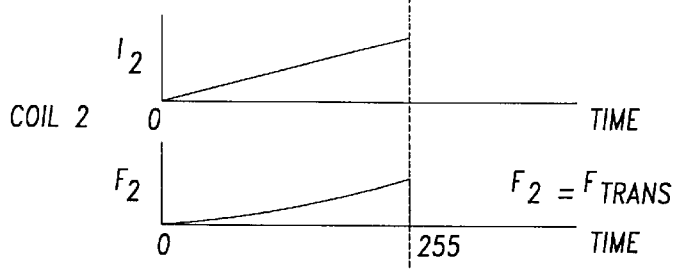
*Fig-3*
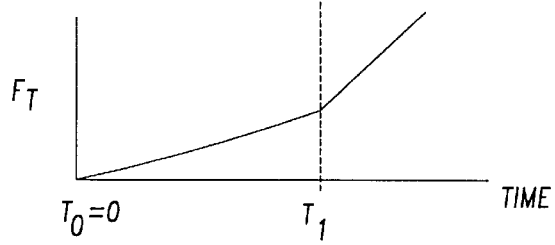

DUAL GAIN PRESSURE CONTROL SOLENOID HAVING ONE BOBBIN WITH TWO INDIVIDUALLY WOUND COILS, A HIGH FORCE COIL AND A LOW FORCE COIL FOR IMPROVING TRANSFER FUNCTION

BACKGROUND OF THE INVENTION

1. Technical Field

The present invention relates generally to solenoid actuators and, more particularly, to a dual gain variable control solenoid having two individually wound and controlled coils for actuating a control element and achieving a desired transfer function.

2. Discussion

Pressure control solenoids are commonly used for numerous applications to electromagnetically actuate an armature which in turn forces a valve element to provide pressure control. In automotive vehicles, solenoids are widely employed to control pressure to a clutch to engage transmission clutch elements or to control pressure to a brake element. Pressure control solenoids are also used to control a valve to vary the opening of a valve port between an open and a closed position.

Conventional pressure control solenoids generally include an armature which is actuated by an electromagnetic attraction and an electromagnetic coil wound about a bobbin. A valve element is often displaced by the armature and a return spring often urges the armature in a direction opposite to the direction of the electromagnetic forces. The electromagnetic attraction of the electromagnetic coil and the resiliency of the return spring apply opposing forces to the armature to vary fluid flow through a valve port which is opened or closed by the valve in a cycle.

Dual coil control solenoids are also known. The typical dual coil solenoid generally includes a pair of electromagnetic coils wound about the bobbin and typically applies opposing forces to the armature. Force in one direction urges the armature in a first direction, while the force in the opposite direction urges the armature in an opposite direction. The conventional solenoids are usually controlled to provide on or off current supply to the coil or coils and therefore resultantly, generally provide a pair of valve positions.

Present applications increasingly require good resolution at low control pressures while maintaining the capacity to provide high control pressure in the same application. For example, some applications require more adequate control of the force applied to or displacement of the armature to apply a wide range of forces or pressures to clutch elements in an automatic transmission where varying forces or pressures are desired.

It is therefore desirable to provide for a dual gain variable control solenoid for actuating a control element to achieve a desired amount of force or pressure.

It is further desirable to provide a dual coil control solenoid having independent variable control currents for each coil.

It is yet further desirable to provide a method of operating a dual coil control solenoid to provide dual gain control of the armature.

SUMMARY OF THE INVENTION

In accordance with the teachings of the present invention, a dual gain control solenoid has a solenoid housing and a bobbin attached thereto. The control solenoid includes a movable armature disposed within a passage and axially movable within the passage. A first coil is wound on the bobbin and is coupled to a first set of terminals for applying a first variable control signal to the first coil. A second coil is wound on bobbin and is coupled to a second set of terminals for applying a second variable control signal to the second coil. The first coil is independently energizable by the first variable control signal to apply a first electromagnetic force in a first direction, while the second coil is independently energizable by the second variable control signal to apply a second electromagnetic force to the armature in the first direction.

According to the present invention, a method of providing dual gain pressure control is also provided. The method includes the step of applying a first variable control signal to a first coil to produce a first electromagnetic force on a movable armature in a first direction and varying the first variable control signal so as to change the amount of force applied to the movable armature. The method further includes the step of applying a second control signal to a second coil so as to apply a second electromagnetic force to the movable armature in the first direction.

BRIEF DESCRIPTION OF THE DRAWINGS

Other objects and advantages of the present invention will become apparent to those skilled in the art upon reading the following detailed description and upon reference to the drawings in which:

FIG. 2 is a end view of the control solenoid of FIG. 1 taken from the bottom end;

FIG. 3 is a graphical representation of the current applied and force realized with the independent coils and the overall force realized with the solenoid according to one operational method;

DETAILED DESCRIPTION OF THE PREFERRED EMBODIMENTS

Figure 1:
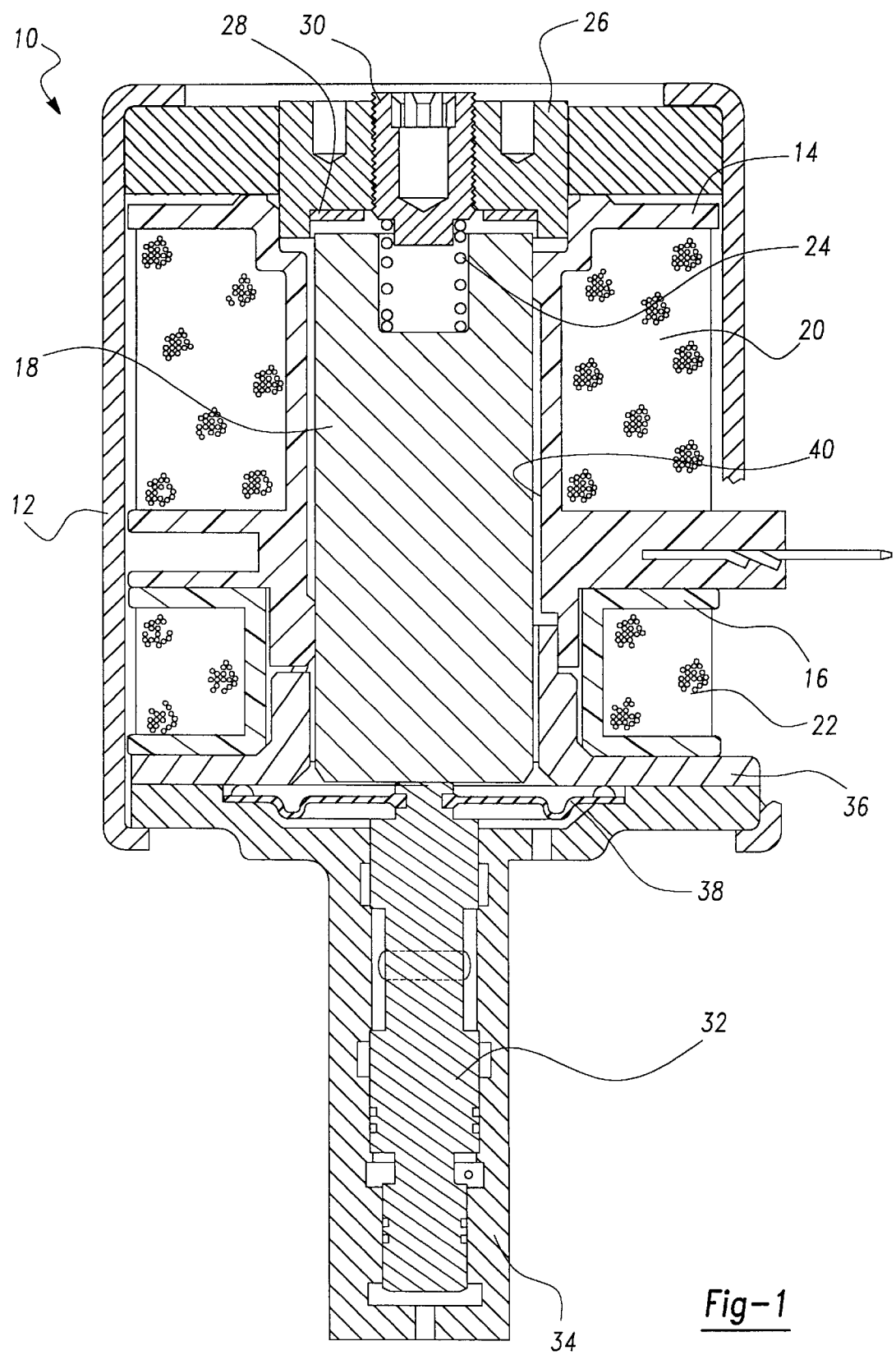
FIG. 1 is a longitudinal, cross-sectional view of a dual gain, dual coil control solenoid arranged in accordance with the principles of the present invention.

Turning now to FIG. 1, a dual gain control solenoid 10 is illustrated therein. The dual gain control solenoid 10 as shown and described herein is a pressure control solenoid for actuating a spool valve to control fluid pressure between a high pressure passage and a low pressure passage. While the control solenoid 10 is shown as an inversely proportional solenoid, one skilled in the art will recognize that the present invention operates in conjunction with a proportional solenoid as well.

The control solenoid 10 has a housing 12 closing a first bobbin 14 and a second bobbin 16. Bobbin 14 has a first or primary electromagnetic coil 20 wound thereon. The second bobbin 16 has a second or secondary electromagnetic coil 22 wound thereon which is independent of the first electromagnetic coil 20. The bobbins 14 and 16 with the respective electromagnetic coils 20 and 22 are axially displaced from each other. One skilled in the art will recognize that a single bobbin may be wound with both coils, rather than using a separate bobbin for each coil.

The control solenoid 10 further includes an armature 18 disposed within a passage 40 provided in bobbins 14. Armature 18 is displaced axially within passage 40 by electromagnetic force provided by coils 20 and 22. An armature spring 24 is disposed within an opening of armature 18 and biases armature 18 in a generally downward direction. A screw adjust 30 enables adjustment of the downward force exerted by armature spring 24. A pole piece 26 electromagnetically interacts with armature 18, so that upon energization of either electromagnetic coils 20 or 21 armature 18 is urged in a generally upward direction toward pole piece 26. Pole piece 26 includes an air gap spacer 28 disposed between pole piece 26 and armature 18.

Housing 12 of control solenoid 10 is fixedly attached to a valve body 34. Within valve body 34 is provided a spool valve 32. Armature 18 exerts a displacing force on spool valve 32. Displacement of spool valve 32 variably reduces fluid at an input pressure to an output pressure. A diaphragm 38 is disposed between armature 18 and spool valve 32 to provide a fluid seal between housing 12 and valve body 34. Also, a flux tube 36 is disposed between bobbin 16 and valve body 34 and completes an electromagnetic circuit for the solenoid 10.

As shown in FIG. 2, the dual gain control solenoid 10 includes input terminals for energizing coils 20 and 22. The first electromagnetic coil 20 has a pair of terminals 42, one of which receives a continuous variable, digital control signal from a first or primary driver 46 and the other of which is coupled to ground. The second electromagnetic coil 22 is connected to a pair of terminals 44, one of which receives a continuous variable, digital control signal from a second or secondary driver 48 and the other of which is coupled to ground. Accordingly, coils 20 and 22 are independently controlled by respective continuous variable, digital control signals. In FIG. 2, primary driver 46 outputs a continuous variable, digital control signal across terminals 42, and a secondary driver 48 outputs a continuous variable, digital control signal across terminals 44. Primary driver 46 controls current input to primary coil 20, and secondary driver 48 controls current input to secondary coil 22.

As stated above, dual gain control solenoid 10 described in FIGS. 1 and 2 includes two electromagnetic coils 20 and 22. First or primary electromagnetic coil 20 has substantially more turns than second or secondary electromagnetic coil 22. As one skilled in the art will readily recognize, when equal current is applied to each of primary coil 20 and secondary coil 22, primary coil 20 generates a greater flux density than secondary coil 22. The difference in flux density is the result of primary coil 20 having a greater number of turns than secondary coil 22 because the magnetic field generated by a coil varies in accordance with a number of turns per unit length of the coil. The resultant magnetic properties of each of the primary coil 20 and secondary coil 22 provide great flexibility in controlling the operation of dual gain control solenoid 10.

Each coil 20 and 22 is digitally controlled by a driver 46 and 48, respectively, which outputs a continuously variable current signal in accordance with a digital input varying in steps from 0 to 255. In this manner, the current range of the driver can be varied from 0 to the maximum current output from the driver in 255 discrete steps. For example, if the maximum output of the current driver varies from 0 amps to 1 amp, one step equates to approximately 3.92 milliamps. The current applied to each electromagnetic coil 20 and 22 varies the electromagnetic force exerted by each electromagnetic coil 20 and 22, and the force exerted by the magnetic coil varies non-linearly over the entire range of currents output by the electromagnetic coil drivers.

In FIG. 3, a first, sequential mode of operation for the dual gain control solenoid 10 will be explained. FIG. 3 depicts for each coil a graph of current versus time and force versus time for the given current at a particular time. Coil 1 corresponds to primary coil 20, and coil 2 corresponds to secondary coil 22. FIG. 3 also depicts a graph of total force versus time, where the total force $F_T$ represents the primary coil force $F_1$ added to the secondary coil force $F_2$ ($F_T=F_1+F_2$). Note that in each of FIGS. 3–7 used to describe the operational modes of the dual gain control solenoid 10 of FIGS. 1 and 2, these conventions will be used throughout.

In FIG. 3, starting at time $T_0$, the input current $I_2$ of secondary coil 22 is ramped from zero ampers or amps (A) to the maximum current input for coil 2 current at time $T_1$. At time $T_1$, secondary driver 48 has thus increased its output current from 0 A at 0 steps to maximum current at 255 steps. Coil 2 resultantly exerts a force $F_2=F_{trans}$ on armature 18 in order to urge the armature 18 in a generally upward direction. Also, at time $T_1$, primary driver 46 outputs a current to coil 1 so that the force $F_1=F_{trans}$. That is, at time $T_1$ coil 1 and coil 2 output an equal force ($F_1=F_2=F_{trans}$). This results in a smooth transition from operation of coil 2 to operation of coil 1. The resultant output force $F_T$ exhibits a gradual ramping of $F_T$ from $T_0$ to $T_1$, followed by a more pronounced increase, due to the increased number of turns of primary coil 20, after time $T_1$.

Figure 4:
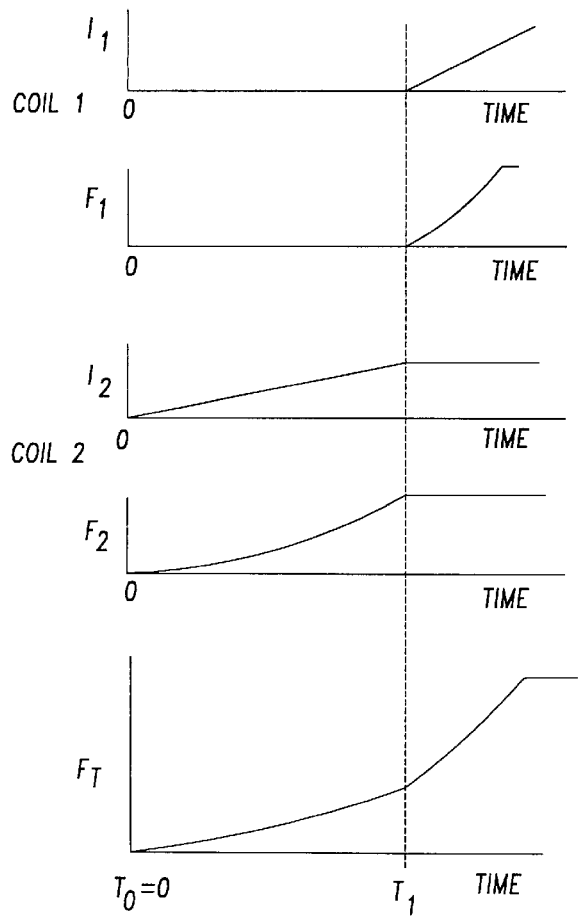
FIG. 4 is a graphical representation of current applied and force realized with independent coils and the overall force realized with the solenoid according to a second operational method.

FIG. 4 depicts a second mode of operation of the dual gain control solenoid 10 of FIGS. 1 and 2. In the second mode of operation, the dual gain control solenoid 10 provides simultaneous operation of primary coil 20 and secondary coil 22 and further provides improved resolution at low current values. The input current $I_2$ applied to the secondary coil 22 is ramped upward from time $T_0$ to time $T_1$. This causes a gradual ramping of the total force $F_T$. At time $T_1$, the primary coil 20 then provides additional force to the force provided by coil 2. In FIG. 4, at time $T_0$, the current $I_2$ applied to secondary coil 22 is increased from zero to its maximum value at time $T_1$. The force $F_2$ output by secondary coil 22 increases in accordance with the increase in current $I_2$. The total force $F_T$ from time $T_0$ to time $T_1$ equals the force $F_2$ exerted by secondary coil 22 during the same time interval. At time $T_1$ and thereafter, the current $I_2$ input to secondary coil 22 remains at the maximum value output by secondary driver 48 in accordance with an input of 255 to secondary driver 48. Also at time $T_1$, primary driver 46 applies an input current $I_1$ to primary coil 20, resulting in a force $F_1$ exerted by primary coil 20. The force $F_1$ of primary coil 20 and the force $F_2$ of secondary coil 22 resultantly add to provide a total force $F_T$ to armature 18. The second operational mode described with respect to FIG. 4 thus enables improved resolution at lower current values, followed by greater force increases applied by secondary coil 20 at higher current values.

Figure 5:
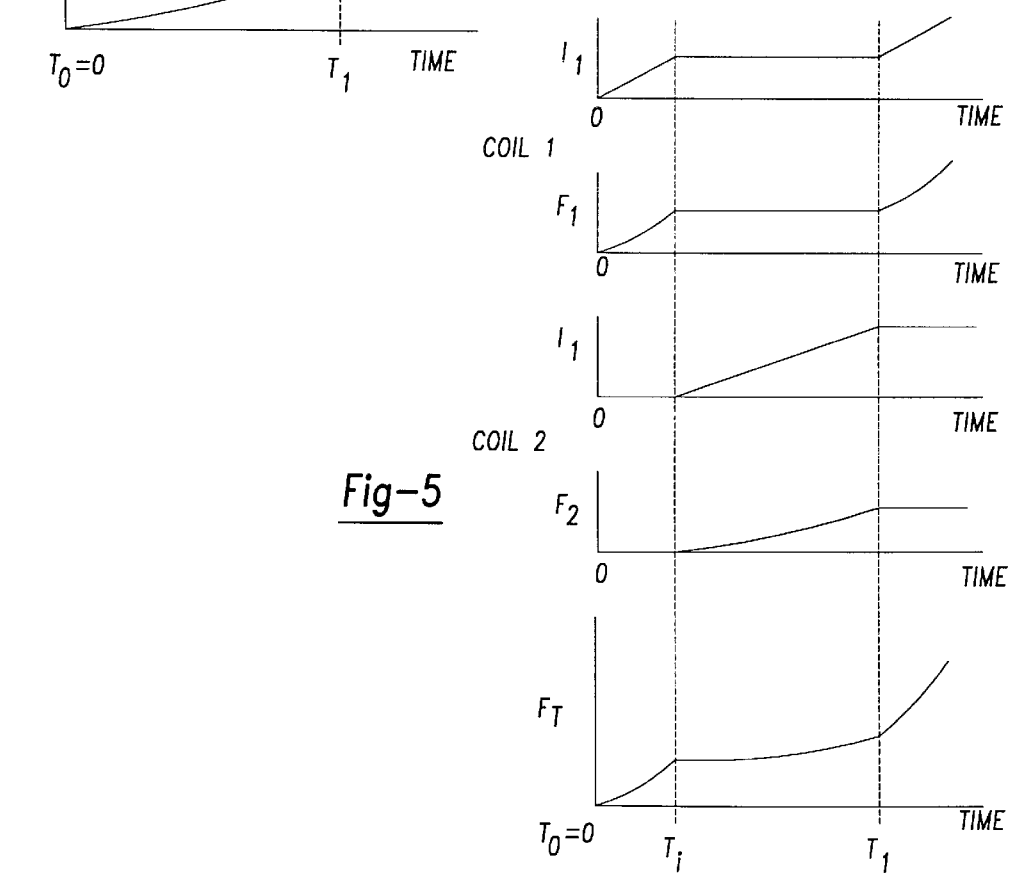
FIG. 5 is a graphical representation of current applied and force realized with independent coils and the overall force realized with the solenoid according to a third operational method.

FIG. 5 depicts a third, simultaneous mode of operation in which the secondary coil 22 is engaged only after the primary coil 20 applies a force $F_1$ to the armature 18. In FIG.

5, the primary coil 20 is energized by input current $I_1$ from time $T_0$ to an intermediate time $T_i$. Energizing primary coil 20 results in a force $F_1$ applied to armature 18. From time $T_0$ to time $T_i$, the total force $F_T$ exerted on armature 18 is equal to the force $F_1$ applied by the primary coil 20. At time $T_i$, coil 2 is then energized with a current $I_2$ from a minimum value of zero to a maximum value at time $T_1$. Secondary coil 22 thus generates a force $F_2$. Simultaneously, the current $I_1$ applied to primary coil 20 is maintained substantially constant from time $T_i$ to time $T_1$. During this time period, the gradual increase in current $I_2$ applied to secondary coil 22 increases the total force $F_T$ from time $T_i$ to time $T_1$. At time $T_1$, the current $I_2$ reaches a maximum, and the current $I_1$ to the primary coil 20 is increased, resulting in an increase force $F_1$ applied by primary coil 20. The resultant force $F_T$ thus increases at a greater rate after time $T_1$.

Figure 6:
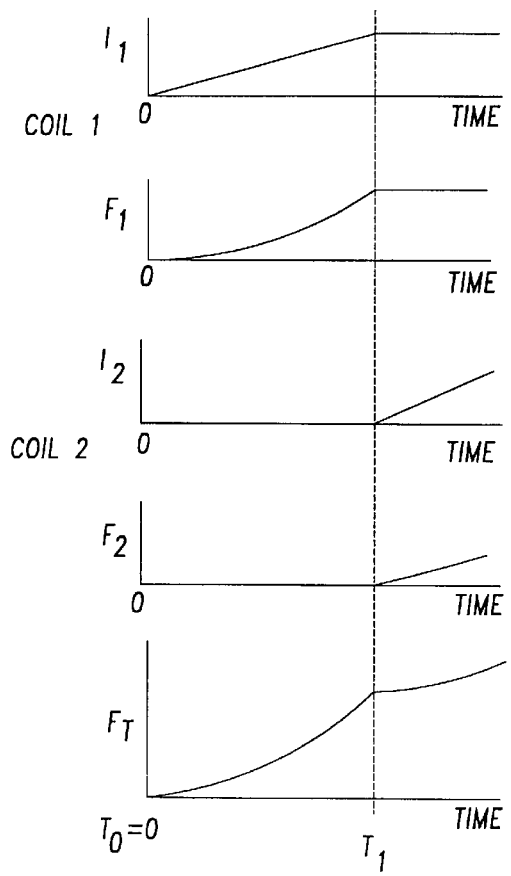
FIG. 6 is a graphical representation of current applied and force realized with independent coils and the overall force realized with the solenoid according to a fourth operational method.

FIG. 6 depicts a forth, simultaneous operational method of control which yields improved resolution at high current values. In FIG. 6, primary 20 coil is energized with a current $I_2$ which increases from zero amps at time $T_0$ to a maximum value at time $T_1$. The application of current to primary coil 20 results in a force $F_1$ applied to armature 18. From time $T_0$ to time $T_1$, the total force $F_T$ on armature 18 is equal to the force $F_1$ exerted by primary coil 20. At time $T_1$, a current $I_2$ is applied to secondary coil 22, resulting in a force $F_2$ applied to armature 18 by secondary coil 22. The forces $F_1$ and $F_2$ add to provide a resultant magnetic force $F_1$ on armature 18.

Figure 7:
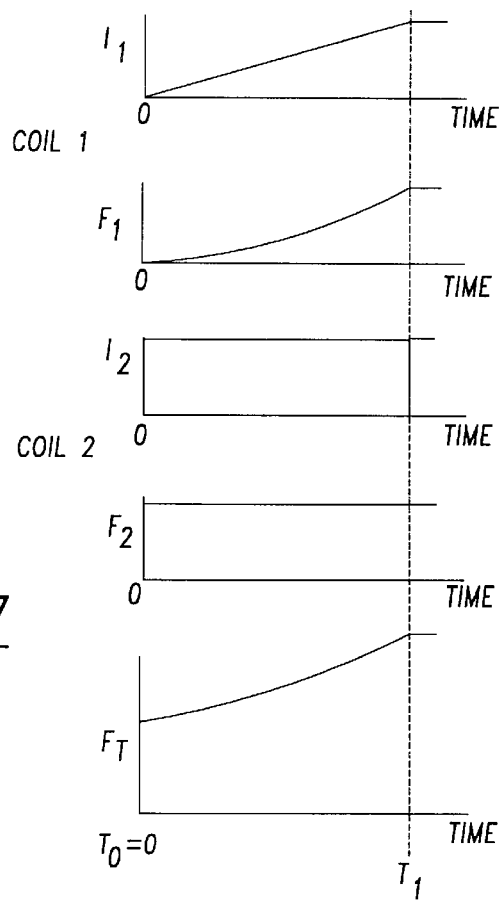
FIG. 7 is a graphical representation of current applied and force realized with independent coils and the overall force realized with the solenoid according to a fifth operational method.

In yet a fifth, simultaneous operational mode, as shown in FIG. 7, the secondary coil 22 provides a stabilizing force increase to the magnetic force applied by primary coil 20. Starting at time $T_0$, the current $I_1$ applied to primary coil 20 is linearly increased from a minimum value to its maximum value at time $T_1$. Also, at time $T_0$, the current $I_2$ is increased in a stepwise manner to its maximum value to provide a corresponding stepwise force $F_2$, resulting in an initial stepwise increase in the total force $F_T$. From time $T_0$ to time $T_1$, as current $I_1$ is linearly increased the force $F_T$ correspondingly increases as well. A particular advantage of the operational method depicted in FIG. 7 is that the secondary driver 48 need only be a current switch, and need not be a digital driver providing control from zero to 255 steps in order to vary the current $I_2$ applied to secondary coil 22.

From the foregoing, one can see that the novel dual gain control solenoid 10 provides a novel method and apparatus for controlling a solenoid. By selecting one of the operational modes, a preferred combination of overall force and resolution may be accomplished. The improved resolution may be implemented at low, intermediate or high forces, depending upon the particular application.

While this invention has been disclosed in connection with a particular example thereof, no limitation is intended thereby except as defined in the following claims. This is because a skilled practitioner recognizes that other modifications can be made without departing from the spirit of this invention after studying the specification and drawings.

What is claimed is:

1. A dual gain solenoid comprising:
   a solenoid housing;
   a bobbin fixedly attached to the solenoid housing;
   a movable armature disposed within a passage, said armature being axially movable within the passage;
   a first coil wound on the bobbin and coupled to a first set of terminals for applying a first continuously variable control signal to the first coil, said first coil being independently energizable by the first continuously variable control signal to apply a first electromagnetic force to the armature in a first direction; and
   a second coil wound on the bobbin and coupled to a second set of terminals for applying a second continuously variable control signal to the second coil, said second coil being independently energizable by the second continuously variable control signal to apply a second electromagnetic force to the armature in the first direction.

2. The solenoid as defined in claim 1 wherein said first variable control signal comprises a first digital output signal and the second variable control signal comprises a second digital output signal.

3. The solenoid as defined in claim 2 wherein said first coil provides variable force in response to the first digital output signal to achieve a low resolution change in force between incremental signal changes, said second coil receiving the second digital output signal and providing a high resolution change in force between incremental signal changes.

4. The solenoid as defined in claim 1 wherein said first electromagnetic force is proportional to the first control signal and the second electromagnetic force is proportional to the second control signal.

5. The solenoid as defined in claim 1 wherein said first coil is axially displaced from the second coil.

6. The solenoid as defined in claim 1 wherein the first coil includes a larger number of turns than the second coil.

7. The solenoid as defined in claim 1 wherein said passage is provided in the bobbin.

8. A solenoid comprising:
   a solenoid housing;
   a bobbin fixedly attached to the solenoid housing and having a passage provided in the bobbin;
   an armature disposed within the passage of said bobbin, said armature being axially movable within the passage;
   a first coil wound on the bobbin and coupled to a first set of terminals for applying a first continuously variable control signal to the first coil, said first coil being independently energizable by the first continuously variable control signal to apply a first electromagnetic force to the armature in a first direction, said first continuously variable control signal providing a first range of gain of electromagnetic force; and
   a second coil wound on the bobbin and coupled to a second set of terminals for applying a second continuously variable control signal to the second coil, said second coil having a greater number of turns than the first coil and being independently energizable by the second continuously variable control signal to apply a second electromagnetic force to the armature in the first direction, said second continuously variable control signal providing a second range of gain which is greater than the first range of gain.

9. The solenoid is defined in claim 8 wherein said first and second variable control signals each comprise a digital signal having discreet output values proportional to the amount of electromagnetic force applied to the respective first and second coils.

10. The solenoid as defined in claim 9 wherein said first coil provides variable force in response to the first digital output signal to achieve a low resolution change in force between incremental signal changes, said second coil receiving the second digital output signal and providing a high resolution change in force between incremental signal change and further providing a greater range of force than the first coil.

11. The solenoid as defined in claim 8 wherein said first coil is axially displaced from the second coil.

12. A solenoid comprising:

a solenoid housing;

a bobbin fixedly attached to the solenoid housing;

a movable armature disposed within a passage, said armature being axially movable within the passage;

a first coil wound on the bobbin and coupled to a first set of terminals for applying a first continuously variable control signal to the first coil, said first coil being independently energizable by the first continuously variable control signal to apply a first electromagnetic force to the armature in a first direction; and a second coil wound on the bobbin and coupled to a second set of terminals for applying a second continuously variable control signal to the second coil, said second coil being independently energizable by the second continuously variable control signal to apply a second electromagnetic force to the armature in the first direction, wherein said first continuously variable control signal comprises a first digital output signal and the second continuously variable control signal comprises a second digital output signal, wherein said first coil provides variable force in response to the first digital output signal to achieve a low resolution change in force between incremental signal changes, said second coil receiving the second digital output signal and providing a high resolution change in force between incremental signal change and further providing a greater range of force than the first coil.

13. A method of providing solenoid control with a dual coil solenoid comprising the steps of:

applying a first variable control signal to a first coil so as to produce a first electromagnetic force on a movable armature in a first direction, said first electromagnetic force providing a first rate of change for incremental changes in the first variable control signal;

varying the first variable control signal continuously over a predetermined range so as to change the amount of force applied to the movable armature in accordance with the first rate of gain of force;

applying a second variable control signal to a second coil so as to apply a second electromagnetic force to the movable armature in the first direction, said second electromagnetic force providing a second rate of gain of force for incremental changes in the second variable control signal; and varying the second variable control signal continuously over a predetermined range so as to change the amount of electromagnetic force applied to the movable armature in accordance with the second rate of gain of force.

14. The method as defined in claim 13 wherein the second rate of gain of force is greater than the first rate of gain of force.

15. A method of providing dual gain solenoid control with a dual coil solenoid comprising the steps of:

applying a first continuously variable control signal to a first coil so as to produce a first electromagnetic force on a movable armature in a first direction, said first electromagnetic force providing a first rate of change for incremental changes in the first continuously variable control signal;

varying the first variable control signal continuously over a predetermined range so as to change the amount of force applied to the movable armature in accordance with the first rate of gain of force;

applying a second continuously variable control signal to a second coil so as to apply a second electromagnetic force to the movable armature in the first direction, said second electromagnetic force providing a second rate of gain of force for incremental changes in the second continuously variable control signal; and varying the second variable control signal so as to change the amount of electromagnetic force applied to the movable armature in accordance with the second rate of gain of force, wherein the second variable control signal is applied after the first variable control signal is maximized so that only one of the first and second variable control signals are changing at one time.

16. A method of providing dual gain pressure control with a dual coil solenoid comprising the steps of:

applying a first variable control signal to a first coil so as to produce a first electromagnetic force on a movable armature in a first direction, said first electromagnetic force providing a first rate of change for incremental changes in the first variable control signal;

varying the first variable control signal continuously over a predetermined range so as to change the amount of force applied to the movable armature in accordance with the first rate of gain of force;

applying a second variable control signal to a second coil so as to apply a second electromagnetic force to the movable armature in the first direction, said second electromagnetic force providing a second rate of gain of force for incremental changes in the second variable control signal; and varying the second variable control signal continuously over a predetermined range so as to change the amount of electromagnetic force applied to the movable armature in accordance with the second rate of gain of force, wherein the second variable control signal is applied simultaneously with the first variable control signal so that the first and second variable control signals vary simultaneously.

\* \* \* \* \*

UNITED STATES PATENT AND TRADEMARK OFFICE
CERTIFICATE OF CORRECTION

PATENT NO. : 5,899,436

DATED : May 4, 1999

INVENTOR(S) : Garrett R. Holmes, et al.

It is certified that error appears in the above-identified patent and that said Letters Patent is hereby corrected as shown below:

Title Page, Item [54], Title, Lines 2-6, after "SOLENOID" delete "HAVING ONE BOBBIN WITH TWO INDIVIDUALLY WOUND COILS, A HIGH FORCE COIL AND A LOW FORCE COIL FOR IMPROVING TRANSFER FUNCTION".

Title Page, Item [57], Abstract, Line 6, "predetermine" should be --predetermined--.

Column 1, Lines 2-6, after "SOLENOID" delete "HAVING ONE BOBBIN WITH TWO INDIVIDUALLY WOUND COILS, A HIGH FORCE COIL AND A LOW FORCE COIL FOR IMPROVING TRANSFER FUNCTION".

Column 2, Line 6, after "on" insert --the--.

Column 2, Line 33, "a" should be --an--.

Column 5, Line 14, "increase" should be --increased--.

Column 5, Line 17, "forth" should be --fourth--.

Column 5, Line 19, "primary 20 coil" should be --primary coil 20--.

Column 5, Line 27, "$F_1$" should be --$F_T$--.

UNITED STATES PATENT AND TRADEMARK OFFICE
CERTIFICATE OF CORRECTION

PATENT NO. : 5,899,436
DATED : May 4, 1999
INVENTOR(S) : Garrett R. Holmes, et al.

It is certified that error appears in the above-identified patent and that said Letters Patent is hereby corrected as shown below:

Column 6, Line 55, "is" should be --as--.

Column 6, Line 57, "discreet" should be --discrete--.

Signed and Sealed this

Eighteenth Day of April, 2000

Attest:

Q. TODD DICKINSON

Attesting Officer          Director of Patents and Trademarks